Dec. 6, 1927.　　　　　　　　　　　　　　　　1,652,049
G. W. ROBERTS
DIRIGIBLE VEHICLE
Filed Feb. 17, 1927　　　　2 Sheets-Sheet 1
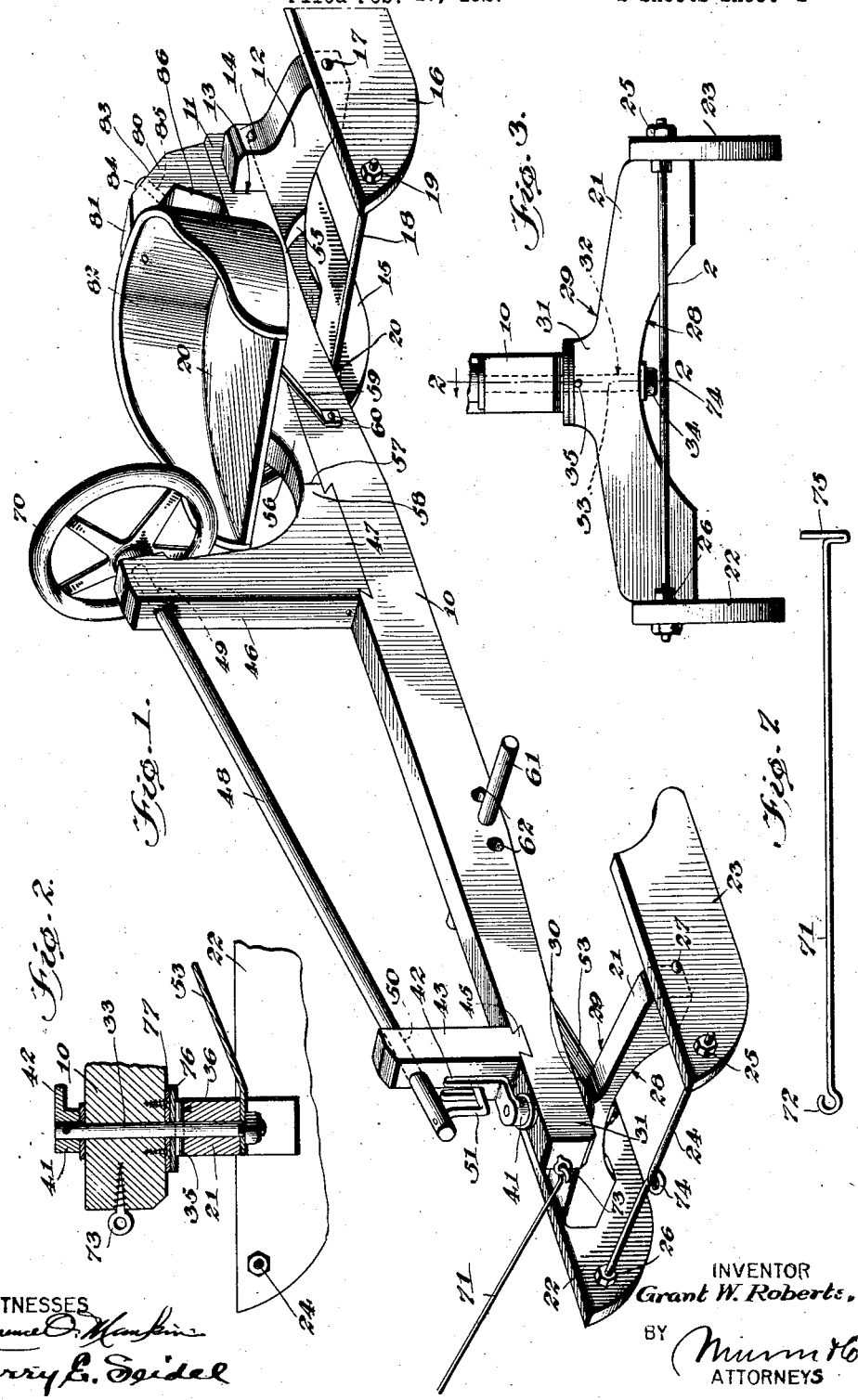
WITNESSES
INVENTOR
Grant W. Roberts,
BY
ATTORNEYS

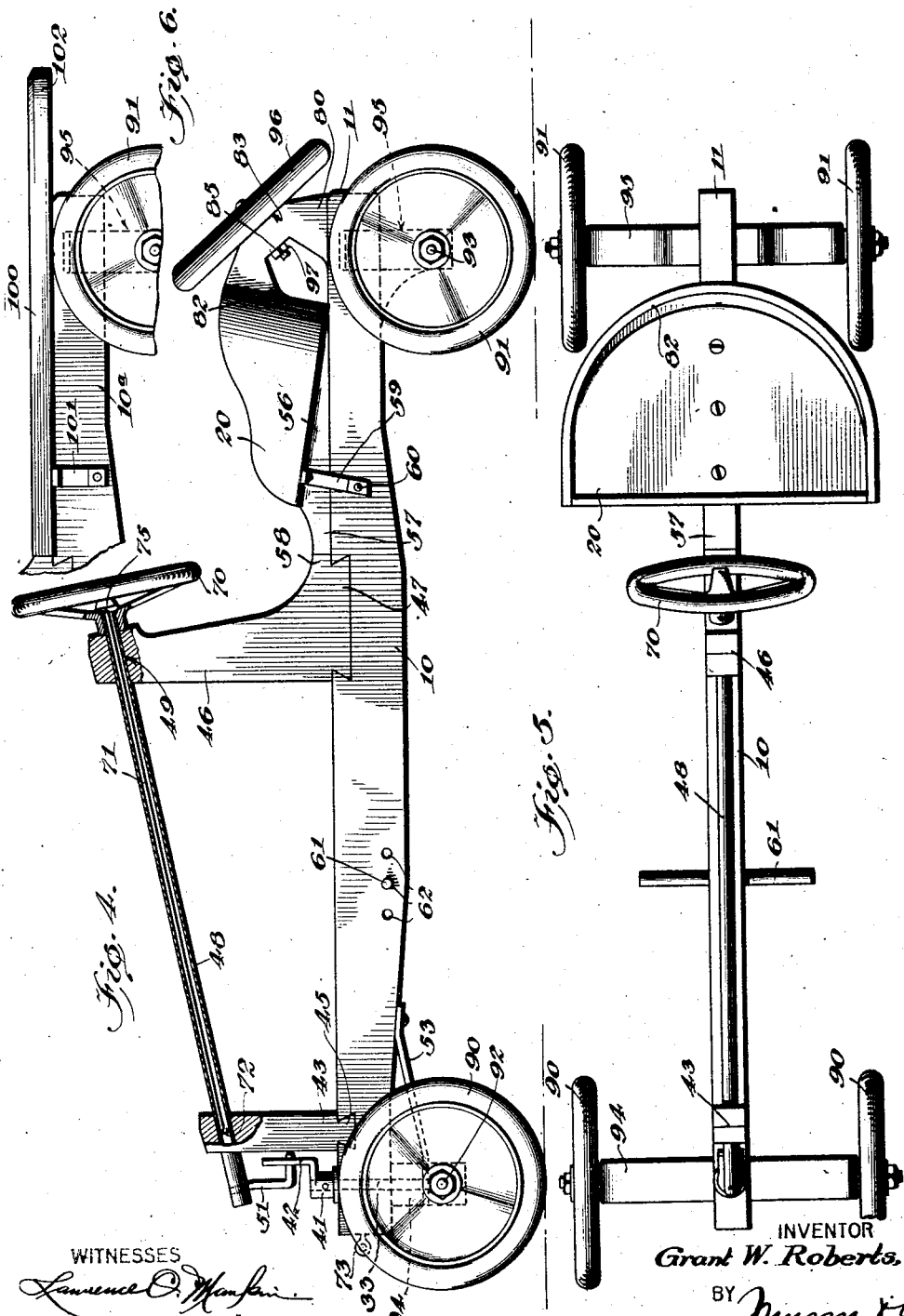

Patented Dec. 6, 1927.

1,652,049

UNITED STATES PATENT OFFICE.

GRANT W. ROBERTS, OF CHICAGO, ILLINOIS, ASSIGNOR TO GRANT W. ROBERTS MANUFACTURING CO., OF CHICAGO, ILLINOIS, A CORPORATION OF ILLINOIS.

DIRIGIBLE VEHICLE.

Application filed February 17, 1927. Serial No. 169,088.

This invention relates to dirigible vehicles, and has for its object the provision of a simply constructed and efficient device which may be controlled manually either when the device is moving on an inclined surface or when being drawn.

Another object of the invention is the provision of a vehicle having a longitudinally disposed beam forming the frame of a device to which is rigidly connected a running gear at the rear end thereof while a dirigible running gear is associated with the front end of the beam, provision being made for manually controlling the front running gear from the seat which is supported on the beam, the operating means for the front or guiding running gear being also supported by the beam.

A further object of the invention is the provision of a compact, simple, durable vehicle for children having a guiding running gear pivotally mounted at the forward end of a centrally and longitudinally disposed beam, the rear running gear being rigid with the rear end of said beam, said beam providing not only a connecting link between the pair of running gears but a supporting frame-work for the seat and dirigible operating means for the guiding running gear, said beam being restricted in width so that it will not interfere with the comfort of the child.

This invention will be best understood from a consideration of the following detailed description, in view of the accompanying drawings forming a part of the specification; nevertheless it is to be understood that the invention is not confined to the disclosure, being susceptible of such changes and modifications which shall define no material departure from the salient features of the invention as expressed in the appended claims.

Figure 1 is a view in perspective of a dirigible sled constructed in accordance with the principles of my invention, Figure 2 is a fragmentary vertical section through the front end of the sled taken along the line 2—2 of Figure 3, Figure 3 is a fragmentary front view of the sled, Figure 4 is a longitudinal view in elevation of a modified form of the vehicle provided with wheels instead of sleds, Figure 5 is a plan view of the vehicle shown in Figure 4, Figure 6 is a fragmentary view in elevation of a modified form of the rear end of the vehicle, and Figure 7 is a longitudinal view of a pull rod for the vehicle.

Referring more particularly to Figures 1 to 3, inclusive, of the drawings, 10 designates a longitudinal beam disposed centrally of the vehicle and rigidly connected at the rear end 11 with a cross bar 12 having a notch 13 to receive said rear end of the beam. Screws 14 or any other suitable securing means are employed for attaching the longitudinal beam to the cross bar 12. A pair of runners 15 and 16 are secured in any approved manner as by screws or bolts 17 to the ends of the cross bar 12, so that the runners will be maintained in parallel vertical relation. A brace bar 18 threaded at its ends is adapted to receive nuts 19 and 20 upon opposite sides of the runners for locking the forward ends of the runners to the rod 18 whereby the said rod in co-operation with the cross bar 12 aids in maintaining the runners in spaced relation. The cross bar 12 together with the runners 15 and 16 and the rod 18 form the rear sled or running gear of the vehicle. A front sled or running gear which is adapted to be manually controlled from the seat 20 is composed of a cross bar 21 and a pair of runners 22 and 23 and a brace rod 24 which is threaded at its opposite ends to receive nuts 25 and 26 upon opposite sides of the forward ends of the runners for maintaining the said ends of the runners in spaced parallel relation. The cross bar 21 is secured at its ends by means of screws 27 or other suitable fastening means to the runners 22 and 23. The bar 21 has segmental portions removed at its underface as shown at 28 and at its upper face, as shown at 29, to reduce the weight of the bar while maintaining its durability and also providing for a boss 30 upon which rests the forward end 31 of the beam 10.

The cross bar 21 is provided with a central vertical passage 32 which provides a bearing for a vertical shaft 33. The lower end is threaded and projects beyond the lower curved face 28 of the bar to receive a nut 34. A pin 35 passes through a perforation in the shaft 33 and is seated within a transverse notch or groove 36 formed in the upper face of the hub portion 30 of the bar 21. When the nut 34 is drawn up tight by the lower threaded end of the shaft 33 the pin 35 is rigidly maintained in the slot or groove 36, thereby not only maintaining the shaft 33 in the bar 21 but maintaining the shaft 33 against rotation with respect to the bar so that when the shaft is rotated the bar 21 will be oscillated as will the runners 22 and 23 forming the supporting elements of the sled. The upper end of the shaft 33 passes through the forward end of the beam 10 and projects above said beam. A sleeve 41 provided with a fork 42 is secured to the projecting end of the shaft. A post 43 has a dove-tailed portion 45 received within a complementarily formed groove in the forward end of the beam 10 and is secured against displacement from the groove in any approved manner as by dowel pins or screws. A second post 46 has a dove-tailed portion 47 received within a similarly formed groove disposed transversely of the beam 10 and this dove-tailed portion is secured in any approved manner to the beam as by means of screws or dowel pins.

A hollow steering post or shaft 48 is mounted in an inclined bearing 49 at the upper end of the post 46 and also in an inclined bearing 50 in the upper end of the post 43 and has at its outer end a prong 51 rigid therewith which is received by the fork 42.

The cross bar 21 is braced by a strap 53 having perforations received by the lower end of the shaft 33 with the free end of said strap being engaged by the nut 34, the other end of the strap being secured to the underface of the forward end of the beam 10. The cross bar 12 is braced by means of a cleat 55 which is secured to the inner face of the bar 12 and to the underface of the rear end 11 of the longitudinal beam 10.

The seat 20 rests upon a block 56 which is secured to the upper face of the beam 10 and has its forward end as shown at 57 in engagement with the reduced end 58 of the base of the post 46. Straps 59 bolted at 60 to the cross beam 10 are secured to the underface of the seat 20. A foot rest 61 is adapted to be inserted through any one of a plurality of passages 62 disposed transversely of the bar 10 and is adapted to be placed in the passage which is most suitable for the resting of the feet of the child and depending upon the size of the child.

The rear or elevated end of the rod 48 has a hand steering wheel 70 secured thereto and is in a convenient position adjacent the seat 20 so that a child may readily operate the steering wheel for rotating the rod 48 and oscillating the steering running gear. As has been stated the rod 48 is hollow and is adapted to receive a wire pull rod 71 having a hook 72 at one end adapted to be received by either a screw eye 73 secured to the forward end of the beam 10 or an eye 74 formed by twisting the intermediate portion of the rod 24. The rear end of the pull rod 71 is provided with a handle 75 adapted to rest against the central portion of the steering wheel 70 when the pull rod 71 is housed within the rod 48, the hook 72 being of such a size so that it may be readily inserted in said steering rod post when not in use. When it is desired to draw the sled or vehicle when the child is too small or incapable of manually controlling the vehicle the pull rod 71 is removed from its housing or steering rod 48 and the hook 72 is inserted in the eye 73. However, when the child is sufficiently capable of operating the vehicle the pull rod 71 may be employed for pulling the sled up the hill or by inserting the hook 72 into the eye 74 thus providing a means for not only drawing the vehicle but for guiding the same.

A washer 76 is located between a washer 77 secured to the underface of the beam 10 and the hub portion 30 of the bar 21. These metal members or washers facilitate in the ready manipulation of the front running gear.

When the child is capable of guiding the sled manually through the steering wheel 70 he will seat himself on the member 20 after having placed the vehicle at the top of an inclined surface. During downward movement of the vehicle he will operate the steering wheel and likewise the hollow rod 48, thereby rocking the prong 51 and oscillating the fork 42 so that the front running gear is oscillated for directing the path of movement of the vehicle. After having reached the bottom of the hill he will remove the pull rod 71 from the housing or steering rod 48 and place the hook 72 in the eye 74 and draw the sled back to its normal uppermost position on the hill. During the descent the operator places his feet on the foot support 61 after the foot support has been placed in the proper passage 62 which will most comfortably support his feet.

A block 80 has its lower end secured to the rear end 11 of the beam 10 and its upper end, as shown at 81, secured to the back 82 of the seat 20. The block has a flat portion 83 facing rearwardly upon which is adapted to be mounted a wheel or other accessory as may be required during the operation of the sled. A bolt 84 is received within a passage 85 and is adapted to provide means for securing the accessory to the flat portion 83. As shown at 86 the block is cut away to provide a passage for the manipulation of the bolt 84 or a nut which is threaded onto the inner end of the bolt.

Referring more particularly to Figures 4 and 5 it will be seen that the vehicle is provided with wheels 90 and 91 mounted on axles 92 and 93, respectively, carried by the cross bars 94 and 95, respectively. This construction is identical with the construction shown in Figures 1 to 4, inclusive, except that the wheels are substituted for the front and rear sleds which provide in this case the running gear of the vehicle. The front axle 92 is actuated because of the fact that it is rigidly secured with the front bar 94 which is revolved through the vertical shaft 33, the fork 42, the prong 51, the steering rod 48 and the steering wheel 70. In this case an additional wheel 96 is locked to the flat portion 83 of the block 80 and a nut 97 secures the bolt 85 and likewise the wheel 96 to said block.

Referring to Figure 6 a modified form is shown which may be supported by the sleds or wheels but which has an extension in the form of a flat board 100 braced at its forward end by angle irons 101 and nailed or secured to the upper face of the beam 10ᵃ in any approved manner as by screws or bolts, the rear end 102 of the board extending beyond the rear end of the beam 10ᵃ and providing a seat for an additional passenger. In this case the block 80 is eliminated. The seat 20 is then secured in any approved manner to the upper face of the board 100 and is so positioned that it gives sufficient room at the rear of the seat for an occupant on the extension 102.

I claim:

1. A vehicle for children comprising a longitudinal beam, a seat mounted thereon, spaced posts mounted on the beam, a steering rod rotatably mounted in the posts and having a steering wheel located adjacent the seat, a vertical shaft mounted for rotation in the forward end of the beam, operative connections between the shaft and the steering rod, a running gear adjacent the shaft for supporting and guiding the vehicle and including a steering bar, said shaft having a threaded end passing through the bar, a nut screwed onto the threaded end of the shaft and in engagement with the underface of the bar, the upper face of the bar having a groove, a pin carried by the shaft and seated in the groove so that when the nut is drawn up tight the shaft will be rigidly secured to the bar, and a running gear secured to the rear end of the beam.

2. A vehicle for children comprising a longitudinal beam, a hollow steering rod, means for rotatably mounting the steering rod on the beam, a shaft carried by one end of the beam, a running gear adjacent the forward end of the beam and rigidly connected with one end of the shaft, operative connections between the other end of the shaft and the steering rod, a running gear rigidly secured to the rear end of the beam, a steering wheel rigid with the free end of the steering rod, a draw bar for the vehicle adapted to be housed by the hollow steering rod when not in use, and means at the forward end of the vehicle adapted to be connected with an end of the draw bar for pulling said vehicle, said draw bar having a handle adapted to be normally in engagement with the steering wheel when said draw bar is housed within the steering rod.

3. A vehicle for children comprising a relatively narrow longitudinal beam disposed widthwise in a vertical plane, spaced posts located in the same plane with the beam and mounted on an edge of said beam, a steering rod rotatably mounted in the posts, a vertical shaft mounted for rotation in the forward end of the beam, a seat mounted on the other end of the beam, one of the posts having a greater height than the other post and disposed adjacent the seat, the greater portion of the beam being located forwardly of the higher post and seat, operative connection between the shaft and steering rod, a running gear secured to the shaft for supporting and guiding the vehicle, and a running gear secured to the rear end of the beam.

4. A vehicle for children comprising a relatively narrow longitudinal beam disposed widthwise in a vertical plane, spaced posts located in the same plane with the beam and mounted on an edge of the said beam, a steering rod rotatably mounted in the upper ends of the posts and disposed at an angle to the beam, a running gear at the forward end of the beam and having operative connections with the steering rod so that said running gear may be oscillated at will, a seat mounted on the other end of the beam and adjacent one of the posts, the other post being disposed adjacent the forward end of the beam, a support on the beam for the seat, a brace for the seat forming a spare wheel carrier, said support for the seat and brace being located in substantially the same plane with the beam, the greater portion of the beam being located forwardly of the seat and the post adjacent said seat, and a running gear secured to the rear end of the beam.

GRANT W. ROBERTS.